US007127205B2

(12) United States Patent
Gervasi et al.

(10) Patent No.: US 7,127,205 B2
(45) Date of Patent: Oct. 24, 2006

(54) FLUOROELASTOMER MEMBERS AND CURING METHODS USING BIPHENYL AND MONOFUNCTIONAL AMINO HYDROCARBON

(75) Inventors: David J. Gervasi, West Henrietta, NY (US); George A. Riehle, Webster, NY (US); Laurence J. Lynd, Macedon, NY (US); Theodore Lovallo, Williamson, NY (US)

(73) Assignee: Xerox Corporation, Stamford, CT (US)

( * ) Notice: Subject to any disclaimer, the term of this patent is extended or adjusted under 35 U.S.C. 154(b) by 162 days.

(21) Appl. No.: 10/990,165

(22) Filed: Nov. 15, 2004

(65) Prior Publication Data

US 2006/0104679 A1 May 18, 2006

(51) Int. Cl.
*G03G 15/20* (2006.01)
*G03G 13/20* (2006.01)
*B05D 3/02* (2006.01)
*B32B 17/10* (2006.01)

(52) U.S. Cl. ...................... 399/333; 399/330; 427/384; 428/334

(58) Field of Classification Search ................ 399/328, 399/330, 333; 219/216; 427/384, 387, 385.5; 428/334; 430/97, 99, 124
See application file for complete search history.

(56) References Cited

U.S. PATENT DOCUMENTS

| | | | | |
|---|---|---|---|---|
| 5,332,641 | A * | 7/1994 | Finn et al. | 430/124 |
| 5,695,878 | A | 12/1997 | Badesha et al. | 428/334 |
| 5,700,568 | A | 12/1997 | Badesha et al. | 428/334 |
| 5,744,200 | A | 4/1998 | Badesha et al. | 427/387 |
| 5,750,204 | A | 5/1998 | Badesha et al. | 427/387 |
| 5,753,307 | A | 5/1998 | Badesha et al. | 427/387 |
| 6,253,055 | B1 * | 6/2001 | Badesha et al. | 430/99 X |
| 6,447,918 | B1 * | 9/2002 | Gervasi et al. | 399/333 X |
| 6,716,502 | B1 * | 4/2004 | Badesha et al. | 399/333 X |
| 6,733,839 | B1 * | 5/2004 | Badesha et al. | 427/387 X |
| 2003/0156867 | A1 * | 8/2003 | Finn et al. | 399/333 |

* cited by examiner

*Primary Examiner*—Sandra L. Brase
(74) *Attorney, Agent, or Firm*—Annette L. Bade

(57) ABSTRACT

A fuser member with a supporting substrate having an outer surface layer of a fluoroelastomer, and the fluoroelastomer outer surface layer is prepared by: a) dissolving a fluoroelastomer; b) adding and reacting a biphenyl compound and a monofunctional amine hydrocarbon compound to form a homogeneous fluoroelastomer solution; and c) subsequently providing a surface layer of the resulting homogeneous fluoroelastomer solution to the supporting substrate.

20 Claims, 3 Drawing Sheets

FLUOROELASTOMER MEMBERS AND CURING METHODS USING BIPHENYL AND MONOFUNCTIONAL AMINO HYDROCARBON

BACKGROUND

Described herein are elastomer surfaces and a process for providing elastomer surfaces, and more specifically to a fluoroelastomer or hydrofluoroelastomer surface on a fuser member useful in electrostatographic, including image-on-image, digital, and the like, apparatuses. In embodiments, a curative package comprising a monofunctional amine hydrocarbon and a biphenyl compound, is used along with the fluoroelastomer. In embodiments, the biphenyl is a bisphenol. In embodiments, the monofunctional amine hydrocarbon compound has the following formula: $NH_2(CH_2)_n(CH_3)_3$, wherein n is a number of from about 1 to about 25, or from about 1 to about 10, or from about 3 to about 6, or from about 4 to about 5.

In a typical electrostatographic reproducing apparatus, a light image of an original to be copied is recorded in the form of an electrostatic latent image upon a photosensitive member and the latent image is subsequently rendered visible by the application of electroscopic thermoplastic resin and pigment particles which are commonly referred to as toner. The visible toner image is then in a loose powdered form and can be easily disturbed or destroyed. The toner image is usually fixed or fused upon a support, which may be the photosensitive member itself or other support sheet such as plain paper.

The use of thermal energy for fixing toner images onto a support member is well known. To fuse electroscopic toner material onto a support surface permanently by heat, it is usually necessary to elevate the temperature of the toner material to a point at which the constituents of the toner material coalesce and become tacky. This heating causes the toner to flow to some extent into the fibers or pores of the support member. Thereafter, as the toner material cools, solidification of the toner causes the toner to be firmly bonded to the support.

Typically, the thermoplastic resin particles are fused to the substrate by heating to a temperature of between about 90° C. to about 200° C. or higher depending upon the softening range of the particular resin used in the toner. It is undesirable, however, to increase the temperature of the substrate substantially higher than about 250° C. because of the tendency of the substrate to discolor or convert into a fire, at such elevated temperatures, particularly when the substrate is paper.

Several approaches to thermal fusing of electroscopic toner images have been described. These methods include providing the application of heat and pressure substantially concurrently by various means, such as a roll pair maintained in pressure contact, a belt member in pressure contact with a roll, and the like. Heat may be applied by heating one or both of the rolls, plate members or belt members. The fusing of the toner particles takes place when the proper combination of heat, pressure and contact time are provided. The balancing of these parameters to bring about the fusing of the toner particles is well known in the art, and can be adjusted to suit particular machines or process conditions.

During operation of a fusing system in which heat is applied to cause thermal fusing of the toner particles onto a support, both the toner image and the support are passed through a nip formed between the roll pair, or plate or belt members. The concurrent transfer of heat and the application of pressure in the nip affect the fusing of the toner image onto the support. It is important in the fusing process that no offset of the toner particles from the support to the fuser member take place during normal operations. Toner particles that offset onto the fuser member may subsequently transfer to other parts of the machine or onto the support in subsequent copying cycles, thus increasing the background or interfering with the material being copied there. The referred to "hot offset" occurs when the temperature of the toner is increased to a point where the toner particles liquefy and a splitting of the molten toner takes place during the fusing operation with a portion remaining on the fuser member. The hot offset temperature or degradation of the hot offset temperature is a measure of the release property of the fuser roll, and accordingly it is desired to provide a fusing surface, which has a low surface energy to provide the necessary release. To ensure and maintain good release properties of the fuser roll, it has become customary to apply release agents to the fuser roll during the fusing operation. Typically, these materials are applied as thin films of, for example, silicone oils to prevent toner offset.

Fusing systems using fluoroelastomers as surfaces for fuser members are described in U.S. Pat. No. 4,264,181 to Lentz et al., U.S. Pat. No. 4,257,699 to Lentz, and U.S. Pat. No. 4,272,179 to Seanor, all commonly assigned to the assignee of the present invention. The disclosures of each of these patents are hereby incorporated by reference herein in their entirety.

U.S. Pat. No. 5,017,432 describes a fusing surface layer obtained from a specific fluoroelastomer, poly(vinylidenefluoride-hexafluoropropylene-tetrafluoroethylene) where the vinylidenefluoride is present in an amount of less than 40 weight percent. This patent further discloses curing the fluoroelastomer with VITON® Curative No. 50 (VC-50) available from E. I. Du Pont de Nemours, Inc., which is soluble in a solvent solution of the polymer at low base levels and is readily available at the reactive sites for crosslinking. This patent also discloses use of a metal oxide (such as cupric oxide) in addition to VC-50 for curing.

U.S. Pat. No. 5,061,965 to Ferguson et al. discloses an elastomer release agent donor layer comprising poly(vinylidenefluoride-hexafluoropropylene-tetrafluoroethylene) where the vinylidenefluoride is present in an amount less than 40 weight percent and a metal oxide. The release agent donor layer is cured with a nucleophilic curing agent in the presence of an inorganic base.

Generally, the process for providing the elastomer surface on the fusing system member includes forming a solvent solution/dispersion by mixing a fluoroelastomer dissolved in a solvent such as methyl ethyl ketone and methyl isobutyl ketone, a dehydrofluorinating agent such as a base, for example the basic metal oxides, MgO and/or $Ca(OH)_2$, and a nucleophilic curing agent such as VC-50 which incorporates an accelerator and a crosslinking agent, and coating the solvent solution/dispersion onto the substrate. The surface is then stepwise heat cured. Prior to the stepwise heat curing, ball milling is usually performed, for from 2 to 24 hours.

Curing can be considered important in the preparation of fluoroelastomers surfaces. The level of cure is important in that it affects the high temperature stability along with both chemical and physical properties of the elastomers. High temperature stability is of significance for fusing subsystem applications, whereas incomplete curing can adversely effect the transfer efficiencies of liquid and dry toners. Fluoroelastomers have been cured as set forth above, comprising the addition of dehydrofluorinating agents. The dehydrofluorinating agents create double bonds, which provide crosslinking cites on the fluoroelastomer. Examples of curing agents include peroxides (for example, bis (2,4-dichlorobenzoyl) peroxide, di-benzoyl peroxide, di-cumyl peroxide, di-tertiary butyl peroxide, and 2,5-dimethyl-2,5-bis (t-butyl peroxy) hexane), diamines, hydrides, oxides, and the like. The preferred curing agents are the basic metal oxides (MgO and $Ca(OH)_2$) and aliphatic and aromatic amines, where the aromatic groups may be benzene, toluene, naphthalene, anthracene, and the like. The particularly preferred curing agents are the nucleophilic curing agents such as VC-50 which incorporates an accelerator (such as a quaternary phosphonium salt or salts) and a crosslinking agent (bisphenol AF). VC-50 is preferred due to the more thermally stable product it provides. The curative component can also be added after ball milling in a solution form. The resulting elastomer is provided on a substrate. Normally, step heat curing occurs next by heat curing at about 93° C. for 2 hours, followed by 2 hours at 149° C., 2 hours at 177° C. and 16 hours at 208° C.

Known curing processes require the addition of curing agents and crosslinking agents, in addition to dehydrofluorinating agents such as the basic metal oxides, MgO and $Ca(OH)_2$. These curing and crosslinking agents, along with the basic metal oxides, increase the cost of the curing process immensely. In addition, roll milling and/or ball milling are normally required in known curing procedures wherein basic metal oxides are used. Roll milling and/or ball milling can be an extremely costly and time-consuming procedure, requiring anywhere from 2 to 24 hours to complete. In addition, the curing procedure is to be followed very carefully and in specific detail in order to form fluoroelastomers with sufficient chemical, physical and thermal stability, along with sufficient toughness.

Moreover, developer and/or toner resins, especially low melt toner resins, tend to react with the metal oxides present in the cured fluoroelastomer surface causing them to bind to the metal oxides. The result is that toner adheres to the surface of the fuser member, resulting in hot offset. An additional failure mode observed in coatings cured with metal oxides, is the phenomenon of particulate "pick-out" that is the result of oxide particles near the surface being ripped out of the elastomer during operation. This can leave voids in the coating surface, which are then easily filled by toner and toner additive materials.

Some of the above problems have been met by improved methods for providing an outer fluoroelastomer surface, such as those methods described in the following patents.

U.S. Pat. No. 5,700,568 discloses a fusing system member having a supporting surface and a basic metal oxide-free outer surface layer of the reaction product of a fluoroelastomer, a polymerization initiator, a polyorganosiloxane and an amino silane.

U.S. Pat. No. 5,695,878 discloses fluoroelastomer surfaces for fusing members and methods for fusing including a method for forming the outer surface including dissolving a fluoroelastomer, adding an amino silane to form a resulting homogeneous fluoroelastomer solution; and subsequently providing a layer of the homogeneous fluoroelastomer solution to the supporting substrate.

U.S. Pat. No. 5,744,200 discloses a method for providing a volume grafted fluoroelastomer outer fuser surface by dissolving a fluoroelastomer in a solvent, adding a nucleophilic dehydrofluorinating agent, such as an amino silane, a polymerization initiator and a polyorganosiloxane, optionally adding an additional amount of amino silane as a curative, and subsequently providing the layer of the homogeneous volume grafted fluoroelastomer on a supporting substrate.

U.S. Pat. No. 5,750,204 discloses a method for providing a fluoroelastomer surface by dissolving a solid fluoroelastomer in a solvent, adding an amino silane, and subsequently providing a layer of the fluoroelastomer on the supporting substrate.

U.S. Pat. No. 5,753,307 discloses a method for providing a fluoroelastomer surface by dissolving a fluoroelastomer, adding a dehydrofluorinating agent, adding an amino silane, and providing the layer on the substrate.

The above patents disclose use of an amino silane as both the coupling and crosslinking, or as both a dehydrofluorinating agent and a curing agent. The amino silanes disclosed in these patents has the following formula: $NH_2(CH_2)_nNH_2(CH_2)_mSi[(OR)_t(R')_w]$ wherein n and m are numbers from about 1 about 20, and preferably from about 2 to about 6; t+w=3; R and R' are the same or different and are an aliphatic group of from about 1 to about 20 carbon atoms, such as methyl, ethyl, propyl, butyl, and the like, or an aromatic group of from about 6 to about 18 carbons, for example, benzene, tolyl, xylyl, and the like. Examples of amino silanes given in the patents include 4-aminobutyldimethyl methoxysilane, 4-aminobutyl triethoxysilane, (aminoethylaminomethyl)phenyl triethoxysilane, N-(2-aminoethyl)-3-aminopropylmethyl dimethoxysilane, N-(2-aminoethyl)-3-aminopropyl trimethoxysilane, N-(2-aminoethyl)-3-aminopropyl tris(2-ethyl-hexoxy)silane, N-(6-aminohexyl) aminopropyl-trimethoxysila 3-(1-aminopropoxy)-3,3-dimethyl-1-propenyl-trimethoxysilane, 3-aminopropyl tris (methoxyethoxyethoxy)-silane, 3-aminopropyldimethyl ethoxysilane, 3-aminopropylmethyl diethoxysilane, 3-aminopropyl diisopropylethoxysilane, 3-aminopropyl triethoxysilane, 3-aminopropyl trimethoxysilane, or 3-aminopropyltris (trimethylsiloxy)silane. Particularly preferred amino silanes listed in the patents are AO700 (N-(2-aminoethyl)-3-aminopropyl trimethoxysilane), 3-(N-strylmethyl-2-aminoethylamino) propyltrimethoxy silane hydrochloride and (aminoethylamino methyl), phenethytrimethoxy all manufactured by Huls of America, Inc.

However, the methods set forth in the above patents did not produce smooth surfaces, which are necessary particularly when the surfaces come in contact with image surfaces. In fuser members, for example, intimate physical contact between the final image and the fuser surface is achieved, and the surface defects on the fuser can transfer to the image, resulting in defects and life shortfalls. Common cure systems involve insoluble metal oxides and inorganic bases, which contribute to a fair amount of surface texture in a cured fluoroelastomer film. The inorganic bases are necessary for dehydrofluorination of the backbone, allowing for a bisphenol AF to crosslink at the site of unsaturation. The roughening effect of the insoluble particle addition has been avoided in the past by extended ball milling or grinding of particulate additives or through the use of soluble aminosilanes. Amino silanes can act as both the base and as the crosslinking agent, resulting in a completely soluble fluoroelastomer coating formulation. Amino silanes may, however, be susceptible to changes in humidity, resulting in inter-oligimerization and potential variability in physical properties and extent of cure.

Therefore, a method for producing a smoother outer fluoroelastomer fuser member surface, along with a method that uses an amino functional compound that is less susceptible to changes in humidity and has less of a potential to inter-oligomerize or have variability in physical properties and extent of cure, is desired.

The fuser system member described herein, and method of preparation, uses a monofunctional amine hydrocarbon compound as the dehydrofluorinating species in a fluoroelastomer cure system, and is combined with bisphenol AF or other similar biphenyl species as the crosslinking molecule. This results in an effective crosslinking system, while maintaining the desired state of a fully soluble crosslinkable coating system. While diamines are effective as crosslinkers in fluoroelastomers (e.g., DIAK 1, DIAK 3, AO700), in embodiments, the desired amino functional molecule described herein includes a monofunctional amino hydrocarbon that has only amine functionality, and wherein the amino functionality is monoamino functionality. In embodiments, the amino functional hydrocarbon does not have methoxy or ethoxy groups present, as they tend to undergo hydrolysis reactions during cure. These hydrolysis reactions can lead to several problems due to condensation, reaction with humidity, and other problems. Since bisphenol crosslinkers have improved high temperature properties over diamines, it is desirable to use these crosslinkers in a way that does not require insoluble additives such as inorganic bases and metal oxides. In embodiments, the amino functional compound has only amino functionality, and the amino functionality is monoamino functionality. In embodiments, the amino functional compound has the following general formula: $NH_2(CH_2)_n(CH_3)_3$, wherein n is a number of from about 1 to about 25, or from about 1 to about 10, or from about 3 to about 6, or from about 4 to about 5.

SUMMARY

Embodiments include a fuser member comprising a supporting substrate having an outer surface layer comprising a fluoroelastomer, and wherein the fluoroelastomer outer surface layer is prepared by: a) dissolving a fluoroelastomer; b) adding and reacting a biphenyl compound and a monofunctional amine hydrocarbon to form a homogeneous fluoroelastomer solution; and c) subsequently providing a surface layer of the resulting homogeneous fluoroelastomer solution to the supporting substrate.

Embodiments also include a fuser member comprising a supporting substrate having an outer surface layer comprising a fluoroelastomer, and wherein the fluoroelastomer outer surface layer is prepared by: a) dissolving a fluoroelastomer; b) adding and reacting a bisphenol compound and a monofunctional amine hydrocarbon compound having the following formula $NH_2(CH_2)_n(CH_3)_3$, wherein n is a number of from about 1 to about 25, to form a homogeneous fluoroelastomer solution; and c) subsequently providing a surface layer of the resulting homogeneous fluoroelastomer solution to the supporting substrate.

In addition, embodiments include a fuser member comprising a supporting substrate having an outer surface layer comprising a fluoroelastomer, and wherein the fluoroelastomer outer surface layer is prepared by a) dissolving a fluoroelastomer selected from the group consisting of (1) a class of copolymers of two of vinylidenefluoride, hexafluoropropylene, and tetrafluoroethylene, (2) a class of terpolymers of vinylidenefluoride, hexafluoropropylene, and tetrafluoroethylene, and (3) a class of tetrapolymers of vinylidenefluoride, hexafluoropropylene, tetrafluoroethylene, and a cure site monomer; b) adding and reacting a biphenyl compound and a monofunctional amine hydrocarbon compound having the following formula $NH_2(CH_2)_n(CH_3)_3$, wherein n is a number of from about 1 to about 25, to form a homogeneous fluoroelastomer solution; and c) subsequently providing a surface layer of the resulting homogeneous fluoroelastomer solution to the supporting substrate.

Moreover, embodiments include an image forming apparatus for forming images on a recording medium comprising: a charge-retentive surface to receive an electrostatic latent image thereon; a development component to apply a developer material to the charge-retentive surface to develop the electrostatic latent image to form a developed image on the charge retentive surface; a transfer component to transfer the developed image from the charge retentive surface to a copy substrate; and a fuser member component to fuse the transferred developed image to the copy substrate, wherein the fuser member comprises a supporting substrate having an outer surface layer comprising a fluoroelastomer, and wherein the fluoroelastomer outer surface layer is prepared by: a) dissolving a fluoroelastomer; b) adding and reacting a biphenyl compound and a monofunctional amine hydrocarbon compound to form a homogeneous fluoroelastomer solution; and c) subsequently providing a surface layer of the resulting homogeneous fluoroelastomer solution to the supporting substrate.

DETAILED DESCRIPTION

Figure 1:
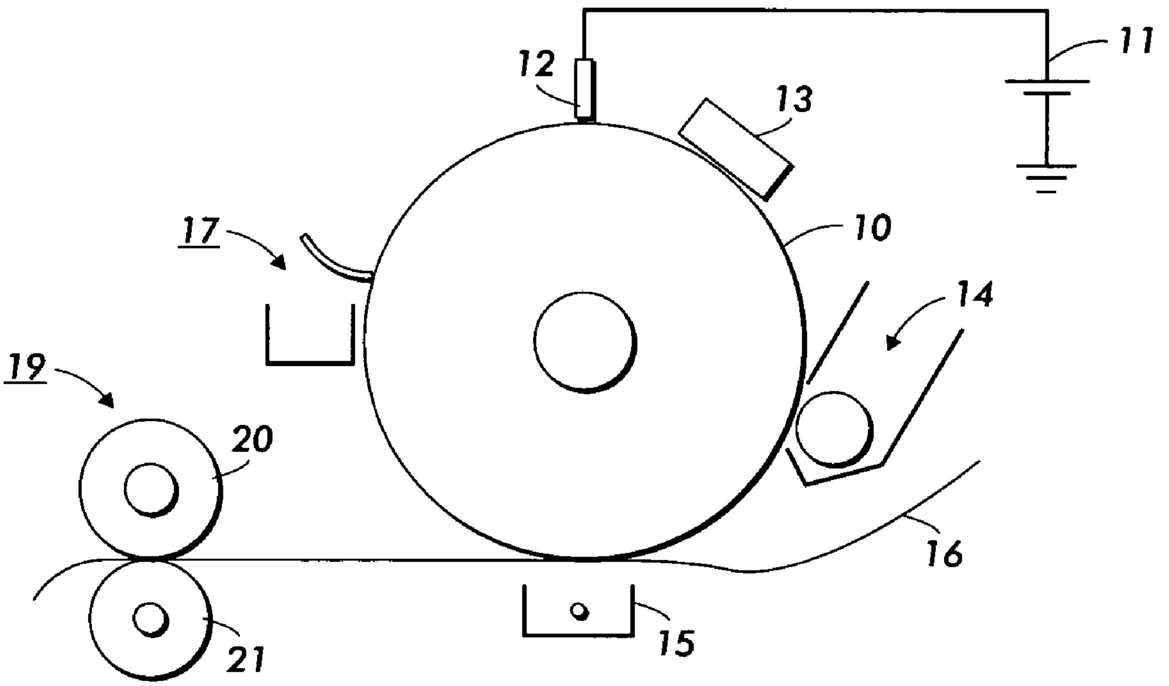
FIG. 1 represents a sectional view of an electrostatographic system.

Referring to FIG. 1, in a typical electrostatographic reproducing apparatus, a light image of an original to be copied is recorded in the form of an electrostatic latent image upon a photosensitive member and the latent image is subsequently rendered visible by the application of electroscopic thermoplastic resin particles, which are commonly referred to as toner. Specifically, photoreceptor 10 is charged on its surface by means of a charger 12 to which a voltage has been supplied from power supply 11. The photoreceptor is then imagewise exposed to light from an optical system or an image input apparatus 13, such as a laser and light emitting diode, to form an electrostatic latent image thereon. Generally, the electrostatic latent image is developed by bringing a developer mixture from developer station 14 into contact therewith. Development can be effected by use of a magnetic brush, powder cloud, or other known development process. A dry developer mixture usually comprises carrier granules having toner particles adhering triboelectrically thereto. Toner particles are attracted from the carrier granules to the latent image forming a toner powder image thereon. Alternatively, a liquid developer material may be employed, which includes a liquid carrier having toner particles dispersed therein. The liquid developer material is advanced into contact with the electrostatic latent image and the toner particles are deposited thereon in image configuration.

After the toner particles have been deposited on the photoconductive surface, in image configuration, they are transferred to a copy sheet 16 by transfer means 15, which can be pressure transfer or electrostatic transfer. Alternatively, the developed image can be transferred to an intermediate transfer member, or bias transfer member, and subsequently transferred to a copy sheet. Examples of copy substrates include paper, transparency material such as polyester, polycarbonate, or the like, cloth, wood, or any other desired material upon which the finished image will be situated.

After the transfer of the developed image is completed, copy sheet 16 advances to fusing station 19, depicted in FIG. 1 as fuser roll 20 and pressure roll 21 (although any other fusing components such as fuser belt in contact with a pressure roll, fuser roll in contact with pressure belt, and the like, are suitable for use with the present apparatus), wherein the developed image is fused to copy sheet 16 by passing copy sheet 16 between the fusing and pressure members, thereby forming a permanent image. Alternatively, transfer and fusing can be effected by a transfix application.

Photoreceptor 10, subsequent to transfer, advances to cleaning station 17, wherein any toner left on photoreceptor 10 is cleaned therefrom by use of a blade (as shown in FIG. 1), brush, or other cleaning apparatus.

Figure 2:
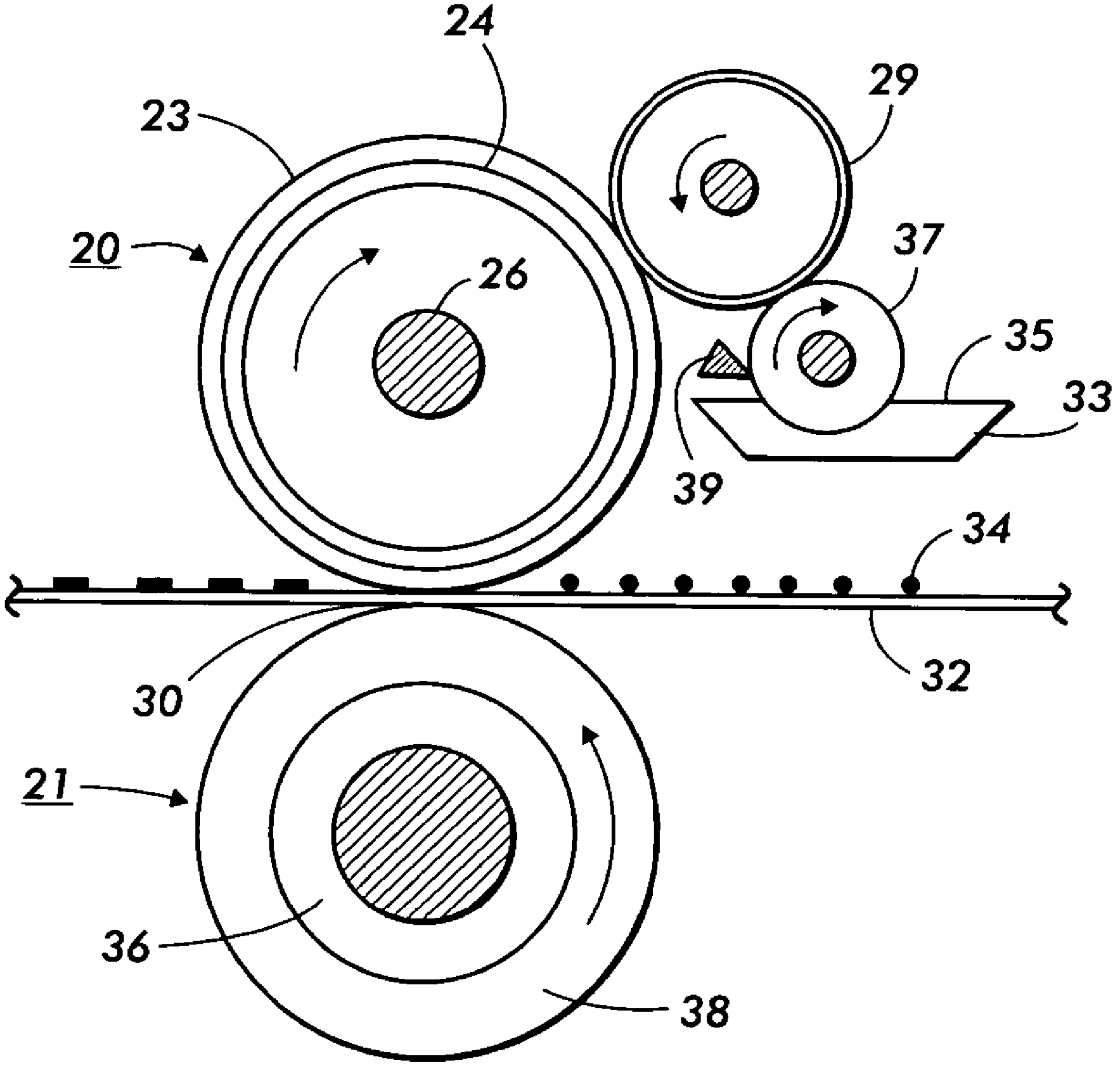
FIG. 2 represents a sectional view of a fuser system, which includes fuser and pressure rollers as an embodiment.

FIG. 2 is an enlarged schematic view of an embodiment of a fuser member, where the numeral 20 designates a fuser roll comprising elastomer surface 23 upon a suitable base member 24, a hollow cylinder or core fabricated from any suitable metal, such as aluminum, anodized aluminum, steel, nickel, copper, and the like, having a suitable heating element 26 disposed in the hollow portion thereof which is coextensive with the cylinder. Backup or pressure roll 21 cooperates with fuser roll 20 to form a nip or contact arc 30 through which a copy paper or other substrate 32 passes such that toner images 34 thereon contact elastomer surface 23 of fuser roll 20. As shown in FIG. 2, the backup roll 21 has a rigid steel core 36 with an elastomer surface or layer 38 thereon. Sump 33 contains polymeric release agent 35 which may be a solid or liquid at room temperature, but it is a fluid at operating temperatures.

In the embodiment shown in FIG. 2 for applying the polymeric release agent 35 to elastomer surface 23, two release agent delivery rolls 37 and 29 rotatably mounted in the direction indicated are provided to transport release agent 35 to elastomer surface 23. Delivery roll 37 is partly immersed in the sump 33 and transports on its surface release agent from the sump to the delivery roll 29. By using a metering blade 39, a layer of polymeric release fluid can be applied initially to delivery roll 29 and subsequently to elastomer 23 in controlled thickness ranging from submicrometer thickness to thickness of several micrometers of release fluid. Thus, by metering device 39, about 0.1 to 2 micrometers or greater thicknesses of release fluid can be applied to the surface of elastomer 23.

Examples of the outer surface of the fuser system members include fluoroelastomers. Specifically, suitable fluoroelastomers are those described in detail in U.S. Pat. Nos. 5,166,031, 5,281,506, 5,366,772 and 5,370,931, together with U.S. Pat. Nos. 4,257,699, 5,017,432 and 5,061,965, the disclosures each of which are incorporated by reference herein in their entirety. As described therein, these elastomers are fluoroelastomers or hydrofluoroelastomers from (1) a class of copolymers of two of vinylidenefluoride, hexafluoropropylene and tetrafluoroethylene, such as those known commercially as VITON A®; 2) a class of terpolymers of vinylidenefluoride, hexafluoropropylene and tetrafluoroethylene known commercially as VITON B®; and (3) a class of tetrapolymers of vinylidenefluoride, hexafluoropropylene, tetrafluoroethylene and cure site monomer known commercially as VITON GH® or VITON GF®.

These copolymer, terpolymers and tetrapolymers are known commercially under various designations as VITON A®, VITON B®, VITON E®, VITON E 60C®, VITON E430®, VITON 910®, VITON GH®; VITON GF®; and VITON ETP®. The VITON® designation is a Trademark of E. I. DuPont de Nemours, Inc. The cure site monomer can be 4-bromoperfluorobutene-1,1,1-dihydro-4-bromoperfluorobutene-1, 3-bromoperfluoropropene-1,1,1-dihydro-3-bromoperfluoropropene-1, or any other suitable, known cure site monomer commercially available from DuPont. Other commercially available fluoropolymers include FLUOREL 2170®, FLUOREL 2174®, FLUOREL 2176®, FLUOREL 2177® and FLUOREL LVS 76®, FLUOREL® being a Trademark of 3M Company. Additional commercially available materials include AFLAS™ a poly(propylene-tetrafluoroethylene) and FLUOREL II® (LII900) a poly(propylene-tetrafluoroethylenevinylidenefluoride) both also available from 3M Company, as well as the Technoflons identified as FOR-60KIR®, FOR-LHF®, NM® FOR-THF®, FOR-TFS®, TH®, and TN505®, available from Montedison Specialty Chemical Company.

The fluoroelastomers VITON GH® and VITON GF® have relatively low amounts of vinylidenefluoride. The VITON GF® and VITON GH® have about 35 weight percent of vinylidenefluoride, about 34 weight percent of hexafluoropropylene and about 29 weight percent of tetrafluoroethylene with about 2 weight percent cure site monomer.

Other suitable fluoroelastomers include Dupont Dow VITON AVH, having 60 weight percent vinylidene fluoride and 40 weight percent hexafluoropropylene; Ausimont Technoflons NH, having 61 weight percent vinylidene fluoride and 22 weight percent hexafluoropropylene; Dupont Dow VITON VTR-6769, having 59 weight percent vinylidene fluoride and 41 weight percent hexafluoropropylene; Ausimont Technoflon P757, having 51 weight percent vinylidene fluoride, 33 weight percent hexafluoropropylene, and 17 weight percent tetrafluoroethylene; Ausimont Technoflon TNS, having 43 weight percent vinylidene fluoride, 31 weight percent hexafluoropropylene, and 26 weight percent tetrafluoroethylene; Dupont Dow VITON GF300, having 35 weight percent vinylidene fluoride, 39 weight percent hexafluoropropylene, and 26 weight percent tetrafluoroethylene; Ausimont Technoflon T439, having 38 weight percent vinylidene fluoride, 35 weight percent hexafluoropropylene, and 26 weight percent tetrafluoroethylene; Daikin G999, having 19 weight percent vinylidene fluoride, 39 weight percent hexafluoropropylene, and 41 weight percent tetrafluoroethylene; Ausimont Technoflon PL958, having 39 weight percent vinylidene fluoride, 1.7 weight percent hexafluoropropylene, 27 weight percent tetrafluoroethylene; 32 weight percent perfluorovinylmethylether, and 32 weight percent propylene; Ausimont Technoflon BR9151, having 24 weight percent vinylidene fluoride, 11 weight percent hexafluoropropylene, 37 weight percent tetrafluoroethylene; 28 weight percent perfluorovinylmethylether, and 28 percent propylene; Ausimont Technoflon P-959, having 38 weight percent vinylidene fluoride, 33 weight percent hexafluoropropylene, and 29 weight percent tetrafluoroethylene; Ausimont Technoflon P-819N, having 33 weight percent vinylidene fluoride, 37 weight percent hexafluoropropylene, and 30 weight percent tetrafluoroethylene; Dupont Dow VITON GF, having 35 weight percent vinylidene fluoride, 33 weight percent hexafluoropropylene, and 32 weight percent tetrafluoroethylene; Dupont Dow VITON E45, having 61 weight percent vinylidene fluoride and 39 weight percent hexafluoropropylene; Dupont Dow VITON B50, having 46 weight percent vinylidene fluoride, 29 weight percent hexafluoropropylene; and 25 weight percent hexafluoropropylene; Daikin G901, having 32 weight percent vinylidene fluoride, 42 weight percent hexafluoropropylene; and 26 weight percent tetrafluoroethylene; Daikin G902, having 33 weight percent vinylidene fluoride, 41 weight percent hexafluoropropylene; and 26 weight percent tetrafluoroethylene Daikin G901; Daikin G912, having 33 weight percent vinylidene fluoride, 40 weight percent hexafluoropropylene; and 26 weight percent tetrafluoroethylene; Daikin G621 having 28 weight percent vinylidene fluoride, 44 weight percent hexafluoropropylene; and 28 weight percent tetrafluoroethylene, and the 4 Daikin fluoroelastomers are FKM terpolymers having 71 weight percent fluorine; Dyneon 7131X having 19 weight percent vinylidene fluoride and 64 weight percent tetrafluoroethylene; Dyneon 7132X having 19 weight percent vinylidene fluoride and 64 weight percent tetrafluoroethylene; AFLAS 100H, having 55 weight percent tetrafluoroethylene and 45 weight percent propylene; AFLAS 100S, having 55 weight percent tetrafluoroethylene and 45 weight percent propylene; AFLAS 150P, having 55 weight percent tetrafluoroethylene and 45 weight percent propylene; and VITON ETP-900 comprising ethylene, tetrafluoroethylene and perfluoromethyl vinylether, and having 67 percent fluorine.

Any known solvent suitable for dissolving a fluoroelastomer may be used. Examples of suitable solvents include methyl ethyl ketone, methyl isobutyl ketone, other organic solvents and the like. The solvent is used in an amount sufficient to dissolve the fluoroelastomer. Specifically, the solvent is added in an amount of from about 25 to about 99 percent, or from about 70 to about 95 percent. The fluoroelastomer is dissolved in the solvent by known means such as by stirring. The mixture can be vigorously stirred by hand or by using a mechanical stirrer. The stirring can continue for from about 1 to about 10 hours, or from about 2 to about 5 hours.

As the crosslinking agent, biphenyl crosslinkers have improved high temperature properties over diamines. Therefore, it is desired to use a biphenyl crosslinker in a way that does not require insoluble additives such as inorganic bases and metal oxides. Examples of suitable crosslinkers include biphenyls such as bisphenols including bisphenol AF [2,2-bis(4-hydroxyphenyl)hexafluoropropane], and the like. The biphenyl crosslinking agent is present in the reaction mixture in an amount of from about 1 to about 9, or from about 3 to about 7, or from about 3 to about 5 pph, relative to the elastomer by weight.

The monofunctional amine hydrocarbon compound can be used as the dehydrofluorinating agent at the beginning of the process for providing a fluoroelastomer surface, and no additional curing agent is necessary. The amine hydrocarbon will act as a dehydrofluorinating agent. However, since the amine hydrocarbon is monofunctional, it will not act as a crosslinker. The monofunctional molecule cannot form a bridge between two chains. Alternatively, a dehydrofluorinating agent can be added, and the fluoroelastomer cured by the amine hydrocarbon as the curing agent. The dehydrofluorinating agent can be as listed above, or an amino silane.

Known amino silanes have methoxy or ethoxy groups, which tend to undergo hyrolysis reactions during curing. These hydroysis reactions can lead to several problems due to condensation, reaction with humidity, and the like. Specifically, the amine compound used herein is a not an amino silane, but instead, is an amine hydrocarbon with only amino functionality, and wherein the amine functionality is monofunctional. In embodiments, the amine hydrocarbon compound has the following formula $NH_2(CH_2)_n(CH_3)_3$, wherein n is a number of from about 1 to about 25, or from about 1 to about 10, or from about 3 to about 6, or from about 4 to about 5. A commercially available example of an amine hydrocarbon falling within the above formula is butylamine, $CH_3(CH_2)_3NH_2$; amylamine, $CH_3(CH_2)_4NH_2$; and the like. The amine hydrocarbon is present in the reaction mixture in an amount of from about 1 to about 9, or from about 3 to about 7, or from about 3 to about 5 pph, relative to the elastomer by weight.

The use of the biphenyl or bisphenol as the crosslinking agent, in combination with the monofunctional amine hydrocarbon and used as the dehydrofluorination agent, results in an effective crosslinking system, while maintaining the desired state of a fully soluble crosslinkable coating system. Metal oxides and ball milling are not required. Further, the surface smoothness is improved. Other benefits include, in embodiments, longer pot working life and improved surface quality.

Other adjuvants and fillers may be incorporated in the elastomer provided that they do not adversely effect the integrity of the fluoroelastomer. Such fillers normally encountered in the compounding of elastomers include coloring agents, reinforcing fillers, and processing aids. Oxides such as copper oxides may be added in certain amounts such as, for example, from about 1 to about 10 volume percent, to fuser roll coatings to provide sufficient anchoring sites for functional release oils, and thereby allow excellent toner release characteristics from such members.

The substrate for the fuser member of the fuser system assembly may be a roll, belt, film, drelt, flat surface or other suitable shape used in the fixing of thermoplastic toner images to a suitable substrate. It may take the form of a fuser member, and in embodiments, is in the form of a cylindrical roll. Typically, the substrate takes the form of a cylindrical tube of aluminum, copper, steel or certain plastic materials chosen to maintain rigidity, structural integrity, as well as being capable of having the fluoroelastomer coated thereon and adhered firmly thereto.

Optional intermediate adhesive layers and/or elastomer layers may be applied to achieve certain desired properties and performance objectives of the present invention. There may be one or more, and up to 10 intermediate layers between the substrate and the outer layer of cured fluoroelastomer if desired. The thickness of the intermediate layer(s) is, for example, from about 0.5 to about 20 mm, or from about 1 to about 5 mm. Typical materials having the appropriate thermal and mechanical properties for such layers include silicone elastomers, fluoroelastomers and TEFLON® PFA sleeved EPDM (ethylene propylene diene monomer) rollers. Examples of intermediate layers include elastomer layers and adhesive layers. An adhesive layer may be selected from a polymeric compound selected from epoxy resins and silanes, for example, epoxy resins, polysilanes and polysiloxanes. Examples of adhesives include proprietary materials such as THIXON 403/404, Union Carbide A-1100, Dow TACTIX 740, Dow TACTIX 741, and Dow TACTIX 742. A particularly preferred curative for the aforementioned adhesives is Dow H41. Examples of elastomer layers include a haloelastomer or a silicone elastomer. The thickness of the intermediate layer is from about 0.5 to about 20 mm, or from about 1 to about 5 mm.

The outer layer of the fuser member can be prepared by dissolving the fluoroelastomer in a typical solvent, such as methyl ethyl ketone, methyl isobutyl ketone and the like. A nucleophilic dehydrofluorinating agent, such as the monofunctional amine hydrocarbon, is then added, followed by stirring for from about 15 to about 60 minutes at a temperature of from about 45° to about 85° C. The resulting solution is then used to fabricate the outer layer of a fuser member by conventional solution coating methods spraying, dipping, flow coating, or the like. The coating thickness can vary depending upon specific applications from about 10 to about 250 micrometers thick. The coating is first air-dried and then step heat cured in air. For fuser application, the thickness of the dry fluoroelastomer layer could be any suitable thickness, for example, from about 25 to about 75 micrometers, or from about 35 to about 50 micrometers. This thickness range is selected to provide a layer thin enough to prevent a large thermal barrier for fusing and thick enough to allow a reasonable wear life. While molding, extruding and wrapping techniques are alternative means, which may be used, in embodiments, the outer layer is prepared by spray or flow-coating successive applications of the solvent solution. When the desired thickness of coating is obtained, the coating is cured and thereby bonded to the roll surface.

The curing time is, for example, from about 30 minutes to about 24 hours, or from about 1 to about 4 hours, or from about 1 to about 2 hours. The temperature for curing is from about 100 to about 150° C., or from about 130 to about 150° C.

The surfaces, in embodiments, do not contain basic metal oxides which tend to bind to developer and/or toner resins, causing build up of toner on the fuser member surface, which causes hot offset, and in turn, results in poor copy quality including toner smudges on the copy substrate, incomplete transfer of images, shorter fuser roll release life, and the like. Since the described method of curing uses a monofunctional amine hydrocarbon compound as the curing agent, the basic metal oxides are not necessary. In addition, ball milling is not necessary.

All the patents and applications referred to herein are hereby specifically, and totally incorporated herein by reference in their entirety in the instant specification.

The following Examples further define and describe embodiments of the present invention. Unless otherwise indicated, all parts and percentages are by weight.

EXAMPLES

Example 1

Preparation of Fluoroelastomer Outer Coating

The following films were prepared by flow coating from solution onto a perfluoroalkoxy (PFA) coated roll. Curing and removal of the coating from the roll obtained a free-standing film for evaluation of physical properties. The novel cure package was compared to the control formulation of a VC-50/metal oxide system for crosslink density (XLD) and percent extractables.

Two polymers were used in the evaluation: Tecnoflon P819N (Ausimont) and Tecnoflon P959 (Ausimont). These two fluorinated terpolymers are similar in their monomer mole percent ratios of vinylidene fluoride, hexafluoropropylene and tetrafluoroethylene, but differ in a distinguishing way. The P959 is a branched polymer, rather than linear, like the P819N. An aminosilane or aminofunctional compound with reduced or zero methoxy or ethoxy functionality as the dehydrofluorinating agent was used in this reaction. Compounds of this type are less susceptible to oligimerization or hydrolysis.

The control formulation used in this example consisted of a curative package containing 7 pph VC-50, 1 pph MgO and 2 pph $Ca(OH)_2$. The monofunctional amino silane compounds used in this study were butylamine and amylamine. Sample films were also prepared using only 7 pph of the VC-50 crosslinker to demonstrate that a basic compound is necessary to achieve film properties in the useful range for a fuser member coating. This useful range is from $1\times10^{-4}$ to $7\times10^{-4}$ moles chains/$cm^3$ crosslink density and less than 20 percent extractables.

Figure 3:
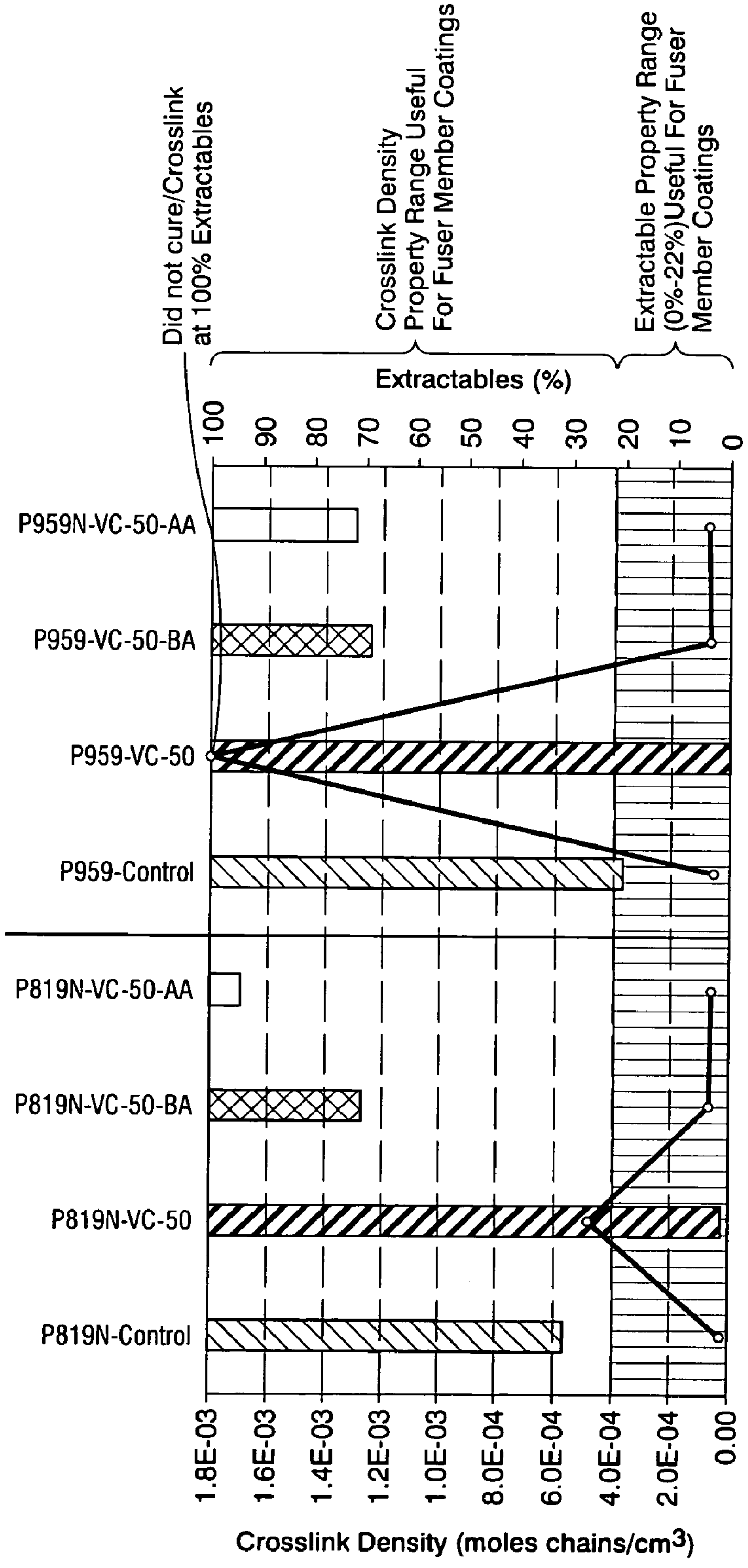
FIG. 3 is a graph of fluoroelastomer coating formulation versus crosslink density as discussed in detail in the Examples.

The results are shown below and are shown in FIG. 3. These results demonstrate that across several different base polymer systems, the combination of biphenyl and monofunctional amine hydrocarbon compound is effective at curing the polymer. The above results demonstrate that the properties of embodiments of the invention are consistent with other curative packages, but simplify the process for making the coating formulation.

| Polymer | Curative | Chart Legend | Crosslink Density [moles chains/cm3] | Extractables [%] | Notes |
|---|---|---|---|---|---|
| A P819N | Control Formulation - 7 pph VC-50 with 1 pph MgO, 2 pph Ca(OH)2 | P819N-Control | 5.68E−04 | 1.42 | |
| | Crosslinker Only - 7 pph VC-50 | P819N-VC-50 | 2.20E−05 | 27.01 | |
| | Crosslinker + Soluble Monofunctional Amine-Hydrocarbon - 7 pph VC-50 with 5 pph Butylamine | P819N-VC-50-BA | 1.27E−03 | 3.68 | |
| | Crosslinker + Soluble Monofunctional Amine-Hydrocarbon - 7 pph VC-50 with 5 pph Amylamine | P819N-VC-50-AA | 1.69E−03 | 3.33 | |
| B P959 | Control Formulation - 7 pph VC-50 with 1 pph MgO, 2 pph Ca(OH)2 | P959-Control | 3.67E−04 | 2.99 | |
| | Crosslinker Only - 7 pph VC-50 | P959-VC-50 | 1.00E−11 | 100 | Did not cure to any measurable extent |
| | Crosslinker + Soluble Monofunctional Amine-Hydrocarbon - 7 pph VC-50 with 5 pph Butylamine | P959-VC-50-BA | 1.24E−03 | 3.89 | |
| | Crosslinker + Soluble Monofunctional Amine-Hydrocarbon - 7 pph VC-50 with 5 pph Amylamine | P959N-VC-50-AA | 1.29E−03 | 4.02 | |

While the invention has been described in detail with reference to specific and preferred embodiments, it will be appreciated that various modifications and variations will be apparent to the artisan. All such modifications and embodiments that may occur to one skilled in the art are intended to be within the scope of the appended claims.

What is claimed is:

1. A fuser member comprising a supporting substrate having an outer surface layer comprising a fluoroelastomer, and wherein the fluoroelastomer outer surface layer is prepared by: a) dissolving a fluoroelastomer; b) adding and reacting a biphenyl compound and a monofunctional amine hydrocarbon compound to form a resulting homogeneous fluoroelastomer solution; and c) subsequently providing a surface layer of the resulting homogeneous fluoroelastomer solution to the supporting substrate.

2. A fuser member in accordance with claim 1, wherein said monofunctional amine hydrocarbon compound has the following formula $NH_2(CH_2)_n(CH_3)_3$, wherein n is a number of from about 1 to about 25.

3. A fuser member in accordance with claim 2, wherein n is a number of from about 1 to about 10.

4. A fuser member in accordance with claim 3, wherein n is a number of from about 3 to about 6.

5. A fuser member in accordance with claim 1, wherein said monofunctional amine hydrocarbon is added and reacted in an amount of from about 1 to about 9 pph, based on the weight of the fluoroelastomer.

6. A fuser member in accordance with claim 5, wherein said monofunctional amine hydrocarbon is added and reacted in an amount of from about 3 to about 7 pph, based on the weight of the fluoroelastomer.

7. A fuser member in accordance with claim 1, wherein said biphenyl compound is a bisphenol compound.

8. A fuser member in accordance with claim 7, wherein said bisphenol is 2,2-bis(4-hydroxyphenyl) hexafluoropropane.

9. A fuser member in accordance with claim 1, wherein said biphenyl compound is added and reacted in an amount of from about 1 to about 9 pph, based on the weight of the fluoroelastomer.

10. A fuser member in accordance with claim 9, wherein said biphenyl compound is added and reacted in an amount of from about 3 to about 7 pph, based on the weight of the fluoroelastomer.

11. A fuser member in accordance with claim 1, wherein said supporting substrate is a fuser roller.

12. A fuser member in accordance with claim 1, further comprising an intermediate layer situated between the supporting substrate and the fluoroelastomer surface.

13. A fuser member in accordance with claim 12, wherein the intermediate layer comprises a silicone elastomer.

14. A fuser member in accordance with claim 1, wherein the outer surface layer has a thickness of from about 25 to about 75 micrometers.

15. A fuser member in accordance with claim 1, wherein the fluoroelastomer is selected from the group consisting of (1) a class of copolymers of two of vinylidenefluoride, hexafluoropropylene, and tetrafluoroethylene; (2) a class of terpolymers of vinylidenefluoride, hexafluoropropylene and tetrafluoroethylene; and (3) a class of tetrapolymers of vinylidenefluoride, hexafluoropropylene, tetrafluoroethylene, and a cure site monomer.

16. A fuser member in accordance with claim 15, wherein the fluoroelastomer is a tetrapolymer comprising about 35 weight percent of vinylidenefluoride, about 34 weight percent of hexafluoropropylene, about 29 weight percent of tetrafluoroethylene, and about 2 weight percent of a cure site monomer.

17. A fuser member comprising a supporting substrate having an outer surface layer comprising a fluoroelastomer, and wherein the fluoroelastomer outer surface layer is prepared by: a) dissolving a fluoroelastomer; b) adding and reacting a bisphenol compound and a monofunctional amine hydrocarbon compound having the following formula $NH_2(CH_2)_n(CH_3)_3$, wherein n is a number of from about 1 to about 25, forming a homogeneous fluoroelastomer solution; and c) subsequently providing a surface layer of the resulting homogeneous fluoroelastomer solution to the supporting substrate.

18. A fuser member comprising a supporting substrate having an outer surface layer comprising a fluoroelastomer, and wherein the fluoroelastomer outer surface layer is prepared by a) dissolving a fluoroelastomer selected from the group consisting of (1) a class of copolymers of two of vinylidenefluoride, hexafluoropropylene, and tetrafluoroethylene, (2) a class of terpolymers of vinylidenefluoride, hexafluoropropylene, and tetrafluoroethylene, and (3) a class of tetrapolymers of vinylidenefluoride, hexafluoropropylene, tetrafluoroethylene, and a cure site monomer; b) adding and reacting a biphenyl compound and a monofunctional amine hydrocarbon compound having the following formula $NH_2(CH_2)_n(CH_3)_3$, wherein n is a number of from about 1 to about 25 to form a homogenous fluoroelastomer solution; and c) subsequently providing a surface layer of the resulting homogeneous fluoroelastomer solution to the supporting substrate.

19. An image forming apparatus for forming images on a recording medium comprising:

a charge-retentive surface to receive an electrostatic latent image thereon;

a development component to apply a developer material to the charge-retentive surface to develop the electrostatic latent image to form a developed image on the charge retentive surface;

a transfer component to transfer the developed image from the charge retentive surface to a copy substrate; and a fuser member component to fuse the transferred developed image to the copy substrate, wherein the fuser member comprises a supporting substrate having an outer surface layer comprising a fluoroelastomer, and wherein the fluoroelastomer outer surface layer is prepared by: a) dissolving a fluoroelastomer; b) adding and reacting a biphenyl compound and a monofunctional amine hydrocarbon compound to form a homogeneous fluoroelastomer solution; and c) subsequently providing a surface layer of the resulting homogeneous fluoroelastomer solution to the supporting substrate.

20. An image forming apparatus in accordance with claim 19, wherein said monofunctional amine hydrocarbon compound has the following formula $NH_2(CH_2)_n(CH_3)_3$, wherein n is a number of from about 1 to about 25.

* * * * *